United States Patent [19]

Carmien

[11] Patent Number: 5,421,931
[45] Date of Patent: Jun. 6, 1995

[54] PROCESS FOR MANUFACTURING REINFORCED ROD ASSEMBLIES, INCLUDING TOOL HANDLES

[76] Inventor: Joseph A. Carmien, 525 N. Maple Dr., Beverly Hills, Calif. 90212

[21] Appl. No.: 45,464

[22] Filed: Apr. 8, 1993

Related U.S. Application Data

[63] Continuation-in-part of Ser. No. 732,042, Jul. 18, 1991, abandoned.

[51] Int. Cl.⁶ ............................ B25G 1/00; B25G 1/10; B32B 31/16; B32B 31/20
[52] U.S. Cl. .................................... 156/172; 16/110 R; 16/DIG. 18; 81/489; 81/492; 156/166; 156/169; 156/242; 156/245; 156/433; 156/500; 156/553; 156/581; 156/583.3; 156/583.5; 294/57
[58] Field of Search ............ 294/57; 16/110 R, 111 R, 16/DIG. 18; 81/489, 492; 156/166, 170–173, 180, 242, 244.15, 244.25, 245.433, 441, 500, 553, 580, 581, 583.3, 583.5, 244.11, 169

[56] References Cited

U.S. PATENT DOCUMENTS

| | | |
|---|---|---|
| Re. 32,364 | 2/1987 | Carmien . |
| T101,401 | 1/1982 | Zion . |
| 2,571,717 | 10/1951 | Howald et al. ................. 156/180 X |
| 3,291,878 | 12/1966 | Boggs . |
| 3,378,884 | 4/1968 | Meteer . |
| 3,567,541 | 3/1971 | Kaczerginski . |
| 3,619,009 | 11/1971 | O'Leary ............................ 294/57 X |
| 4,063,838 | 12/1977 | Michael . |
| 4,236,386 | 12/1980 | Yates et al. ...................... 156/172 X |
| 4,238,540 | 12/1980 | Yates et al. ...................... 156/172 X |
| 4,300,321 | 11/1981 | Preis et al. . |
| 4,440,593 | 4/1984 | Goldsworthy . |
| 4,469,541 | 8/1984 | Goldsworthy . |
| 4,570,988 | 2/1986 | Carmien . |
| 4,605,254 | 8/1986 | Carmien . |
| 4,639,029 | 1/1987 | Kolonia ................................ 294/57 |
| 4,673,541 | 6/1987 | Watanabe et al. . |
| 4,739,536 | 4/1988 | Bandera et al. ................... 16/111 R |
| 4,752,313 | 6/1988 | Allaire et al. . |
| 4,770,834 | 9/1988 | Nakasone et al. ............... 156/180 X |
| 4,772,438 | 9/1988 | Watanabe et al. . |
| 4,803,819 | 2/1989 | Kelsey . |
| 4,820,366 | 4/1989 | Beever et al. . |
| 5,264,060 | 11/1993 | Lambing et al. ................ 156/166 X |

FOREIGN PATENT DOCUMENTS 2831318 2/1979 Germany ......................... 156/244.15

Primary Examiner—Adrienne C. Johnstone
Attorney, Agent, or Firm—Kelly, Bauersfeld & Lowry

[57] ABSTRACT

A composite tool handle includes one or more load-bearing jackets surrounding a core of lightweight or reinforcing material. The interface between the core and the jacket is corrugated to increase the flexural strength of the tool handle while minimizing weight. The composite tool handle is manufactured by pultrusion wherein the core having a corrugated outer surface is fed through a pultrusion die tube. Resin coated fibers are channeled into the space between the core and the die tube for compression and heating to form a fiber-resin jacket having an internal surface conforming to the shape of the core for key-lock engagement therewith. The outer surface of the fiber-resin jacket can be formed with a corrugated or other discontinuous surface shape by placing one or more external mold members into the space between the resin coated fibers and the die tube for pultrusion therewith through the die tube, and for separation from the fiber-resin jacket upon exiting the die tube. A secondary jacket can then be molded onto the fiber-resin jacket in conformance with the corrugated shape thereof.

15 Claims, 4 Drawing Sheets

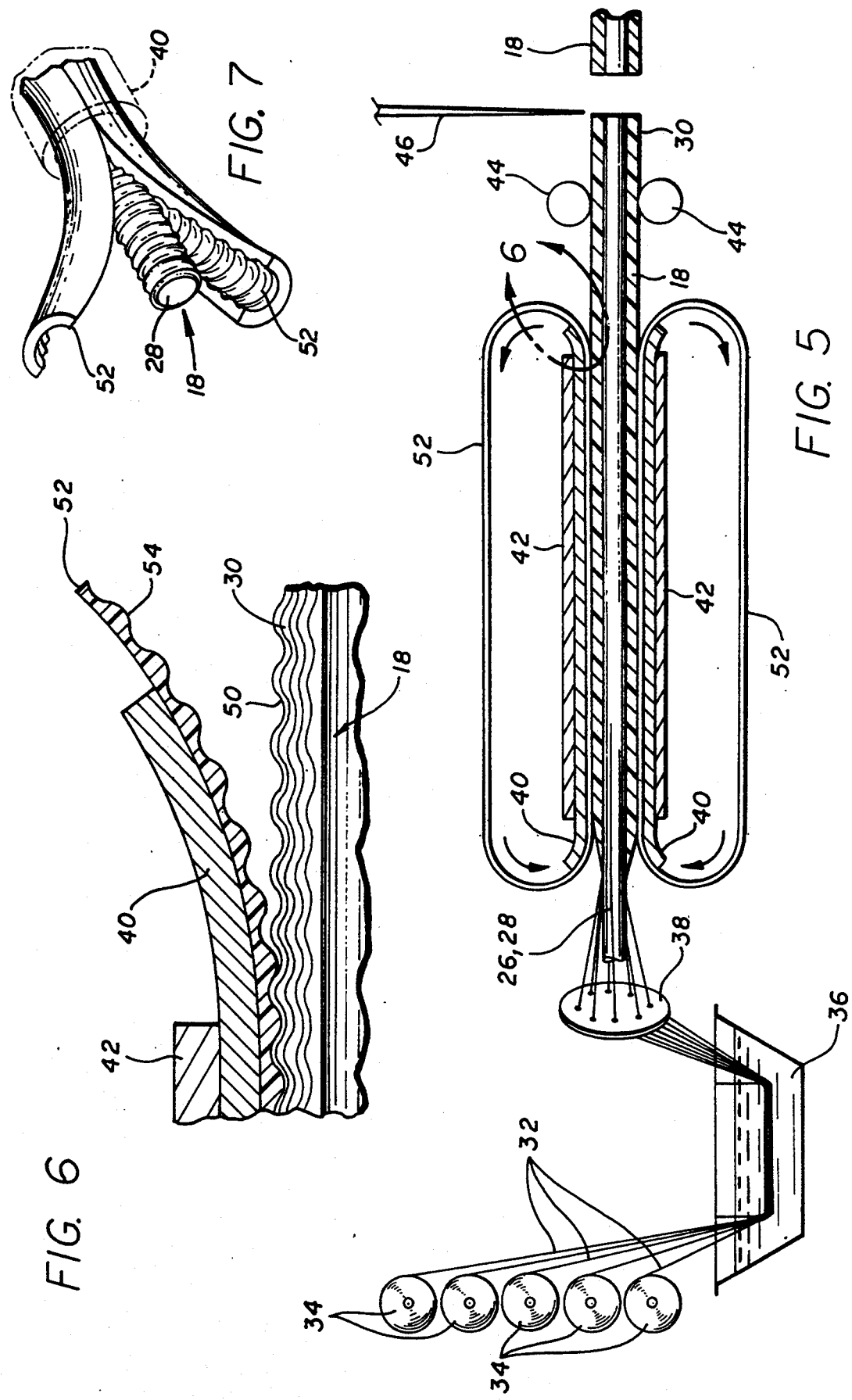

PROCESS FOR MANUFACTURING REINFORCED ROD ASSEMBLIES, INCLUDING TOOL HANDLES

BACKGROUND OF THE INVENTION

This is a continuation-in-part of U.S. Ser. No. 07/732,042, filed Jul. 18, 1991, now abandoned.

This invention relates generally to fiber-resin composite pultrusion methods and products. More particularly, the present invention relates to composite tool handles and the like having a construction which significantly increases the strength of such handles without a significant corresponding increase in weight.

In manufacturing a handle for a hand tool such as a shovel, a variety of competing design considerations are at stake. On the one hand, it is desirable to have a handle that is as light as possible, to provide for easy use by consumers. On the other hand, the handle must have the structural integrity to withstand the variety of stresses that will be placed on it. Wooden handles have been widely used in the past, but provide an often unacceptable compromise of weight versus structural integrity, and vice versa.

An alternative to wooden handles is the use of rods formed from resin coated fibers. The basic technique for running filaments through a resin bath and then through an elongated heated die tube to produce a cured composite rod of the same shape as the die tube has been known for some time. See, for example, U.S. Pat. Nos. 2,948,649 and 3,556,888. This method, however, produces a solid extruded product which is unacceptably heavy and/or too rigid for many tool handle applications.

The weight problem can be alleviated by means of an existing process to extrude hollow tubes utilizing a die tube with the center filled, leaving an annular cross-section through which the resin coated fibers are pulled. This weight reduction is achieved, however, at the cost of significantly reduced bending or flexural strength in comparison with a solid rod, resulting in a tool handle which would not be suitable for use in certain high-stress applications such as general purpose shovel handles. Further, to increase interlaminar strength of the tube forming fibers, a substantial percentage of fibers running other than in a longitudinal direction have been thought to be required.

The bending strength of tool handles can be improved by producing fiber-resin rods which are substantially hollow or lightweight throughout a major portion of their length, but reinforced at areas of expected high stresses during tool use. Such improved tool handles and related methods are shown in U.S. Pat. No. 4,570,988, the contents of which are incorporated herein by reference. These composite tool handles have further been improved by the introduction of one or more reinforcing beads of fiber-resin material extending the length of the load-bearing rod. Such tool handles are shown in U.S. Pat. No. 4,605,254, the contents of which are incorporated herein by reference.

Although such above-described composite tool handles are generally superior to wooden handles, the competitive pressures of the marketplace have encouraged tool handle manufacturers to seek new processes, materials and construction techniques to further increase the strength of composite tool handles without introducing additional weight and/or cost to the handle. In this regard, it is important to permit use of the most economical glass fibers and the most reasonably priced resins to produce a product that has the greatest value to the end user. However, common glass fibers and resins have physical properties which are often less desirable when utilized in a composite tool handle than other more exotic and costly fibers and resins. Accordingly, one objective is to obtain higher mechanical strength properties in a composite material tool handle while permitting the manufacturer to use relatively less costly fiber and resin materials.

It is well known that utilizing unidirectional strands of resin coated glass fibers in a pultrusion process is the most economical process for manufacturing a composite tool handle. In many cases, glass fibers such as a fabric mat veil have been introduced into the pultrusion process to reduce interlaminar failure or to increase the hoop strength of the handle by providing cross-fibers within the cured fiber-resin composite load-bearing jacket of the tool handle. The use of cross-fibers, however, typically and undesirably increases the costs associated with manufacture of composite tool handles and decreases tensile strength of the handle along the length thereof. Thus, to increase interlaminar and hoop strength of the handle, some tensile and flexural strength is sacrificed.

Stress testing of composite tool handles has revealed several common characteristics of the tool handle as it fails under increasing loads. When a flexure load is applied perpendicularly to the longitudinal axis of a composite tool handle, the first failure usually occurs very close to the center of mass of the tool handle perpendicular to the applied load and extending longitudinally through the tool handle. This failure is in shear, between the fibers of the resin. Following this initial shear failure, the handle is then separated into two relatively equal half sections which perform as independent units at half the overall load-bearing value of the original tool handle. As the load is increased further, the next failure occurs as a compression failure in the bottom half of the original section of the tool handle. Composite tool handles are far stronger in tension (due to the strength characteristics of the fiber materials), whereas the compressive loads are borne almost entirely by the interfiber resinous material.

Accordingly, there has been an on-going need for improved composite tool handles and related manufacturing processes to provide significantly increased tensile and flexural strength without a corresponding increase in the weight of the handle. Such a manufacturing process preferably permits use of relatively low-cost fiber and resin materials, and utilizes unidirectional fibers in a pultrusion process. Additionally, there exists a need for a composite tool handle having increased interlaminar and hoop strength without the use of cross-fibers. Further, a composite tool handle and related manufacturing process is needed which is compatible with prior techniques for localized strengthening of the tool handle, as by, for example, the use of alternating sections of lightweight filler core and strong reinforcing core within the composite load-bearing jacket, and the use of longitudinally extending reinforcing beads. Moreover, a novel composite tool handle and related manufacturing process is needed which greatly improves the handle's resistance to shear failure through the resin in a direction perpendicular to the applied load, as exhibited in prior composite tool handles. The present invention fulfills these needs and provides other related advantages.

SUMMARY OF THE INVENTION

The present invention resides in an improved process for manufacturing an elongate reinforced rod assembly that may be used, for example, as a tool handle, and a resultant composite tool handle having a construction which significantly increases the strength of the handle without a corresponding increase in weight. The tool handle comprises, generally, a core having a corrugated outer surface, and a fiber-resin load-bearing jacket formed around the core to securely position and hold the core within the jacket. An inner surface of the fiber-resin jacket conforms to the core outer surface to key-lock the jacket to the core. This construction helps to prevent failure of the composite handle under flexural loads by increasing the handle's resistance to shear failure through the resin between the fibers.

In a preferred form of the invention, the core includes alternating lightweight filler and relatively strong reinforcing core sections. The lightweight and reinforcing core sections extend longitudinally along the length of the tool handle, with each reinforcing core section being located at a position along the handle whereat higher loads and stresses are anticipated during normal handle use. By contrast, the filler core sections are located at positions whereat relatively lower loads are expected.

The fiber-resin jacket includes a corrugated outer surface along at least a portion of its length. A secondary or outer jacket is applied as by injection molding to the fiber-resin jacket over the corrugated outer surface such that an inner surface of the secondary jacket conforms to the corrugated outer surface of the fiber-resin jacket to key-lock the secondary jacket to the fiber-resin jacket. In one typical configuration, the secondary jacket includes a reinforcing tip molded onto one end of the fiber-resin jacket to strengthen the handle at its point of attachment to a tool head, and an elongated grip molded onto the fiber-resin jacket for the balance of the tool handle length. The corrugations of the core and the outer surface of the fiber-resin jacket preferably have a sinusoidal configuration. As such, each corrugation is about 0.030 inch deep and about 1.125 inch long. In other applications the corrugations will vary both in depth and frequency; in some instances the depth will be deeper such as 0.060 inch with frequencies of 0.060 inch between corrugations.

The process for manufacturing an elongate reinforced rod assembly that may be used, for example, as a tool handle includes the steps of feeding the core having the corrugated outer surface into a pultrusion die tube, surrounding the core with resin coated fibers, and pulling the core through the pultrusion die tube under heat and pressure while keeping the core surrounded by the resin coated fibers. The resin coated fibers are cured around the core to form the fiber-resin jacket having the inner surface which conforms to the corrugated outer surface of the core to key-lock the fiber-resin jacket to the core.

The corrugations in the outer surface of the fiber-resin jacket are also formed by the pultrusion process. More particularly, one or more external mold members are channeled into the pultrusion die tube, in the space between the die tube and the resin coated fibers, to shape the outer surface of the jacket. A mold insert belt having a corrugated face may be used for this step. Alternately, or in addition, mold shells having a selected irregular profile face can be used to shape the external surface of the load-bearing jacket. In either case, the external mold members are separated from the load-bearing jacket upon exiting the pultrusion die.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 5 is a schematic representation of a pultrusion machine adapted to perform the manufacturing process of the present invention;

FIG. 6 is an enlarged fragmented and partially sectional view of the area indicated by the encircled region 6 in FIG. 5, showing the manner in which a mold insert belt is utilized to create corrugations on an outer surface of the load-bearing jacket;

FIG. 7 is a fragmented perspective view which further illustrates separation of the mold insert belt from the fiber-resin jacket;

DETAILED DESCRIPTION OF THE PREFERRED EMBODIMENTS

Figure 1:
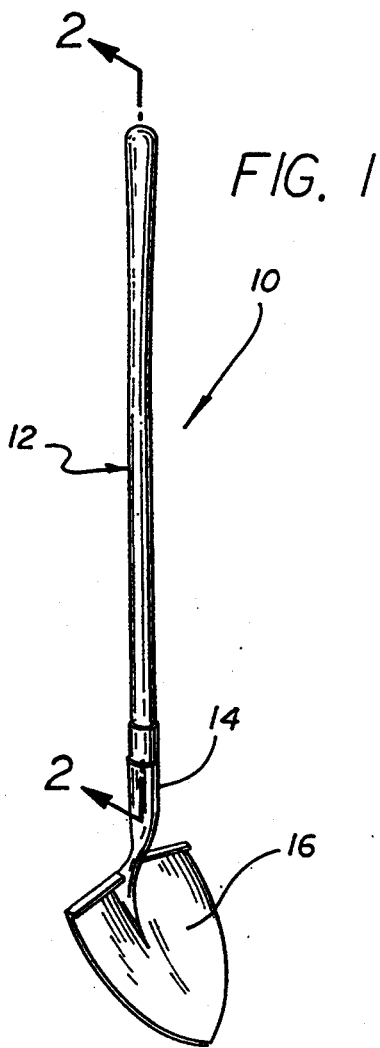
FIG. 1 is a perspective view of the shovel having a tool handle manufactured in accordance with the present invention.
Figure 3:
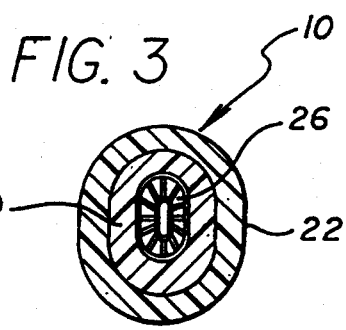
FIG. 3 is a horizontal section taken generally along the line 3—3 of FIG. 2.
Figure 4:
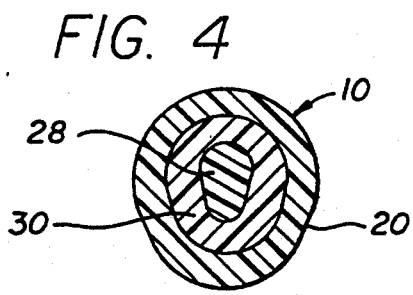
FIG. 4 is a horizontal section taken generally along the line 4—4 of FIG. 2.
Figure 2:
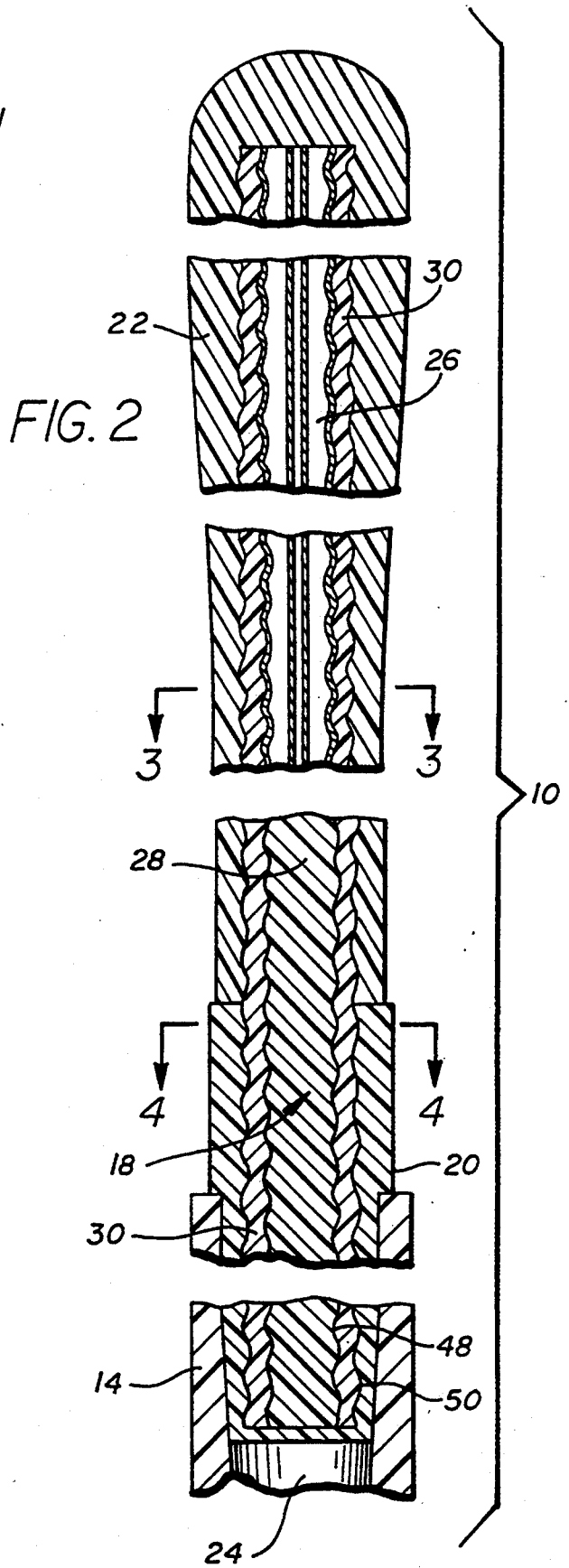
FIG. 2 is an enlarged fragmented sectional view taken generally along the line 2—2 of FIG. 1, illustrating construction of the tool handle to include alternating sections of a lightweight filler core and a reinforcing core surrounded by a load-bearing fiber-resin jacket, wherein the cores and the fiber-resin jacket are key-locked together during a pultrusion manufacturing process, and further illustrating placement of the secondary or outer jacket in the form of a reinforcing tip over one end of the fiber-resin jacket, which is inserted into a socket of the shovel blade, and a grip extending upwardly from the reinforcing tip.

As shown in the drawings for purposes of illustration, the present invention is concerned with a novel composite tool handle, generally designated an elongate reinforced rod assembly forming in the accompanying drawings by the reference number 10. The tool handle 10 comprises a component of a shovel 12 when inserted into a socket 14 of a shovel blade 16. The tool handle 10 of the present invention exhibits superior flexural strength in comparison with wooden handles and prior fiber-resin composite tool handles, without increasing the weight of the handle itself.

In accordance with the present invention, and as illustrated with respect to an exemplary shovel handle in FIGS. 1–4, the tool handle 10 comprises a load-bearing rod 18 having molded thereon a reinforcing tip 20 at a front end thereof, and a grip 22 situated adjacent to the reinforcing tip and extending rearwardly over the remainder of the load-bearing rod. The reinforcing tip 20 and the grip 22 generally ensheathe the load-bearing rod 18. The reinforcing tip 20 is configured for insertion into the socket 14 of the shovel blade 16, and is secured therein by any suitable conventional means. A socket filler plug 24, such as that shown and described in U.S. Pat. No. Re. 32,364, extends from the front end of the reinforcing tip 20 into the shovel socket 14 to prevent compressive failure of the socket.

The load-bearing rod 18 is manufactured by a pultrusion process (schematically illustrated in one preferred form in FIGS. 5 and 6), and includes alternating sections of lightweight filler core 26 and reinforcing core 28 surrounded by a cured fiber-resin jacket 30. The reinforcing core 28 is preferably located within the fiber-resin jacket 30 at those points where the greatest flexural stresses on the tool handle 10 are anticipated during normal tool use. The lightweight filler core sections 26 extend through the remainder of the load-bearing rod 18 to minimize the weight of the tool handle 10. In the exemplary drawings, a reinforcing core section 28 is shown within the front end of the load-bearing rod 18 which is inserted into the shovel socket 14. By contrast, the lightweight core sections 26 are shown to extend through the remainder of the rod 18.

The outer surface of the reinforcing core 28 and, if desired, all or a portion of the outer surface of each lightweight filler core 26 is corrugated to permit the fiber-risen jacket 30 to be key-locked to the cores. Similarly, in the preferred form of the invention, the outer surface of the fiber-resin jacket 30 is also provided with an irregular longitudinal profile such as a corrugation 40 formed along at least a portion of its length to permit the reinforcing tip 20 and/or the grip 22 to be key-locked to the load-bearing rod 18. By key-locking the laminate interfaces of the tool handle 10 in the manner shown, resistance to flexural stress-induced failure is significantly increased. It has been found that a composite tool handle 10 utilizing key -locks between adjacent layers of materials are far less likely to fail than tool handles manufactured in accordance with standard manufacturing processes. As illustrated best in FIGS. 2 and 6, the corrugations provided on the cores 26 and 28, and on the outer surface of the fiber-resin jacket 30 are sinusoidal in shape. In this configuration, the typical corrugation is approximately 1.125 inch long and approximately 0.030 inch deep. The present invention, however, is not limited to this specific type of corrugation, but includes various types of irregular profiles which permit adjoining layers of the tool handle to be key-locked together. Importantly, for optimum strength in a tool handle or the like formed by pultrusion, it is desirable for the cross-sectional area of the load-bearing fiber-resin jacket 30 to remain substantially constant.

The composite tool handle 10 is manufactured in accordance with a novel pultrusion process illustrated schematically, in part, in FIGS. 5 and 6. More specifically, to manufacture the load-bearing road 18, a fiber material 32 is drawn off a series of spools or bales 34, then passed through a resin bath 36, and through a carding disc 38 into a pultrusion die tube 40 where the fibers surround alternating sections of the lightweight filler and reinforcing cores 26 and 28. The resin coated fibers 32 are pulled through the die tube 40, and are heated and cured about the cores 26 and 28 by a conventional conduction heater or a microwave heating element 42, which surrounds the die tube. The cured rod 18, consisting of the fiber-resin jacket 30 surrounding the core sections 26 and 28, is pulled out of the die tube 40 by tractor-type pullers 44 and cut into the desired length by a conventional cutting device 46.

Preferably, each reinforcing core 28 and at least a portion of each lightweight filler core 26 has corrugations 48 or the like formed into their respective outer surfaces prior to being drawn through the die tube 40. The resin coated fibers 32, which when cured form the fiber-resin jacket 30, are shaped under heat and pressure to fill-in the spacing between adjacent corrugations to key-lock the fiber-resin jacket 30 to the cores 26 and 28.

The selected irregular profile such as corrugations 50 is imparted to the fiber-resin jacket 30 by feeding one or more external mold members 52 through the pultrusion die tube 40, within the space between the internal die tube surface and the outer surface of the jacket 30. FIGS. 6 and 7 show the external mold members 52 in the form of a pair of mold insert belts each having a generally semicircular cross section to cooperatively encircle and thus enclose the fibers 32 as they are pultruded through the die tube. The two mold insert belts 52 have concave faces 54 defined by a longitudinally extending sequence of regular corrugations 50, resulting in formation and curing of the outer surface of the jacket 30 in conformance with the corrugations 50. FIGS. 6 and 7 further illustrate separation of the belts 52 from the rod 18 at the exit end of the pultrusion die tube 40. In this regard, the belts 52 may be fed intermittently through the die tube 40, or in a continuous loop as shown in FIG. 5.

The mold insert belts 52 include a non-skid backing to permit them to slide easily along the surfaces of the die tube 40, and the facing surfaces 54 are formed to be nonreactive with the resin coated fibers forming the fiber-resin jacket 30. Under some conditions, it may be desirable to treat the facing surfaces 54 of the mold insert belts 52 with a release agent to ensure that the belts are easily separated from the fiber-resin jacket 30 of the load-bearing rod 18 as it exits the die tube 40.

The resultant load-bearing rod 18 manufactured as described in connection with FIGS. 5 and 6 has significantly greater resistance to flexural stresses imposed thereon than similar load-bearing rods which do not have the facing laminate portions key-locked together. Provision of the cores 26 and 28 having outer corrugations ensures that the fiber-resin jacket 30 will be key-locked to the cores. The use of the mold insert belts 52 provide outer corrugations on the fiber-resin jacket 30, which permits a secondary jacket comprising the reinforcing tip 20 and the grip 22 to be molded thereon in a manner which key-locks each to the load-bearing rod 18.

Figure 8:
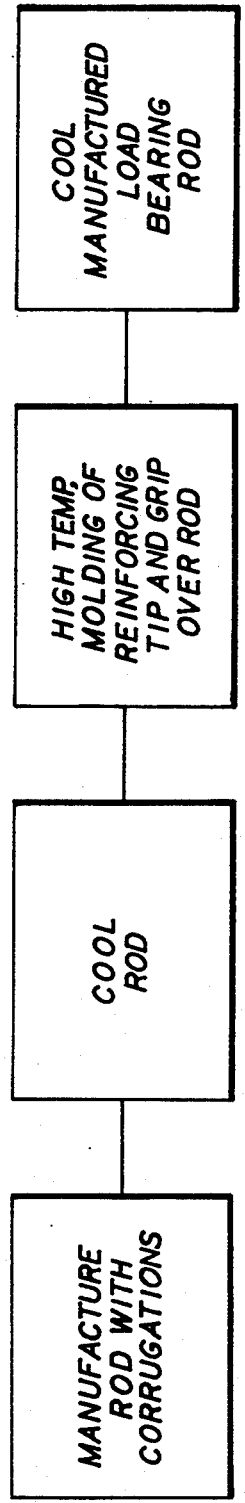
FIG. 8 is a block diagram flow chart illustrating a sequence of process steps in accordance with the invention.

As mentioned previously, and with reference to the flow chart of FIG. 8, the reinforcing tip 20 and the grip 22 are molded over the load-bearing road 18. In particular, the rod 18 is initially cooled, followed by application of the tip 20 and grip 22 as by injection molding or the like. In this regard, the material forming the reinforcing tip 20 and the grip 22 comprise a thermoplastic or the like which is injection molded in a flowable state at a temperature on the order of about 350°–500° F. The heated thermoplastic material is cooled and cured on the jacket 18, essentially in the form of a secondary or outer jacket, wherein the cooled tip 20 and grip 22 undergo significant shrinkage on the rod 18 and thus compressively engage the rod to enhance the key-lock effect.

The reinforcing tip 20 is shown in a configuration suitable for insertion into the socket 14 of the shovel blade 16. The reinforcing tip 20 should be highly resistant to the bending stresses exerted upon the shovel handle 10 at its attachment to the shovel blade 16, and preferably is formed of a glass-filled nylon material. The grip 22 is preferably molded into a desired shape from any material which is strong and yet comfortably handled by a user. The grip 22 primarily serves as a convenient surface by which the user can grasp the tool handle 10. When key-locked to the load-bearing rod 18, however, it does provide substantially increased strength to the tool handle 10 rearwardly of the reinforcing tip 20.

FIGS. 9–12 illustrate an alternative preferred form of the apparatus and method of the present invention, wherein modified external mold members 152 are channeled through the pultrusion die tube 40 to impart a selected irregular profile shape to the outer surface of the load-bearing jacket 30 of the rod 18. In this regard, for sake of convenience and ease of description, components generally conforming to those shown and described with respect to FIGS. 1–7 will be identified by the same reference numerals.

Figure 9:
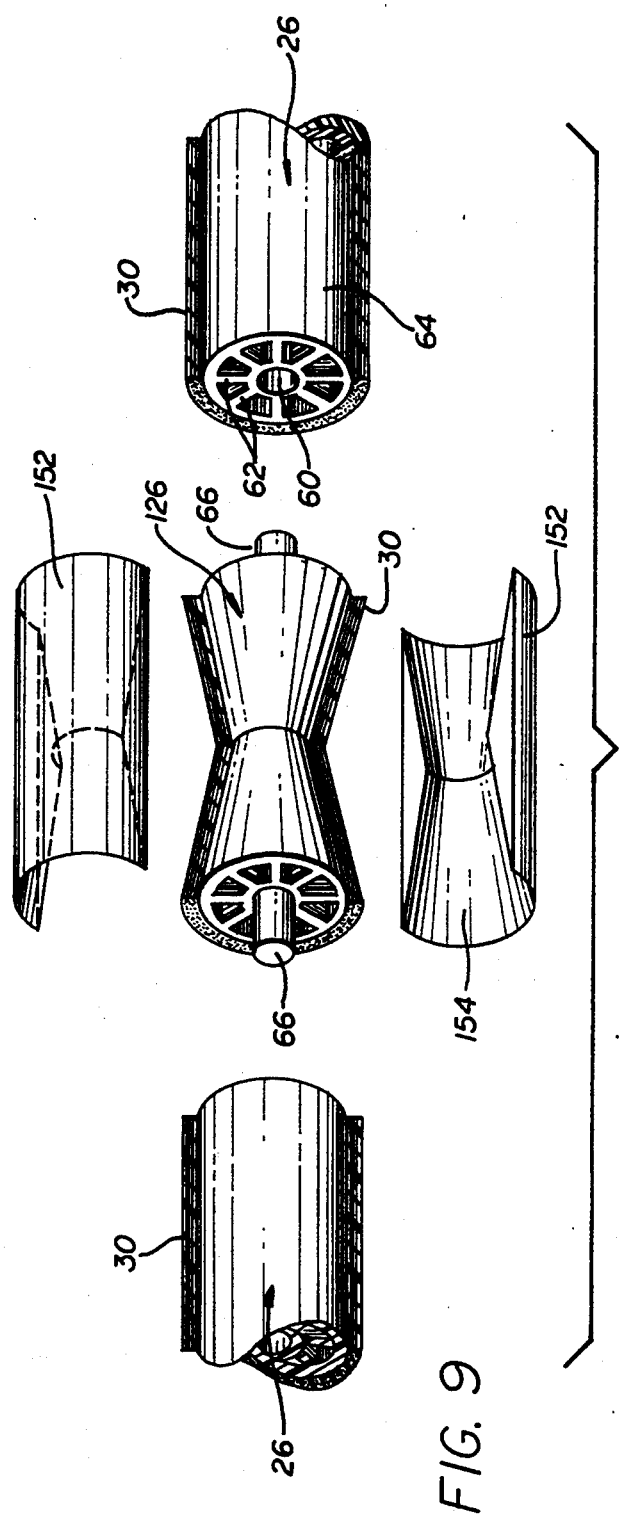
FIG. 9 is an exploded and partially fragmented perspective view showing assembly of alternative external mold members with the core and resin coated fibers to shape the outer surface of the load-bearing jacket.

More specifically, FIG. 9 shows a pair of the lightweight filler core sections 26 adapted for insertion as previously described into the pultrusion die tube 40, with the resin coated fibers 32 channeled into the die tube in surrounding relation to the core sections 26. These filler core sections are depicted with a so-called wagon wheel cross section defined by a central hub 60 joined by spokes 62 to an outer cylinder 64 having a substantially smooth-surfaced or constant longitudinal profile.

At selected locations along the length of the tool handle to be constructed, a modified filler core 126 is inserted in-line with the other core sections forming the rod 18. The modified core section 126 (FIG. 9) also has a wagon wheel type cross section and may include axially protruding connector pins 66 for slide-fit reception into the hubs 60, for example, of adjacent core sections 26. Importantly, the outer surface of the modified filler core 126 presents an irregular profile such as a tapered geometry shown in FIG. 9 to expand in diameter from a longitudinally centered location toward opposite ends of the core section. Other longitudinally irregular profile configurations may be used, such as a corrugated surface or the like.

Figure 10:
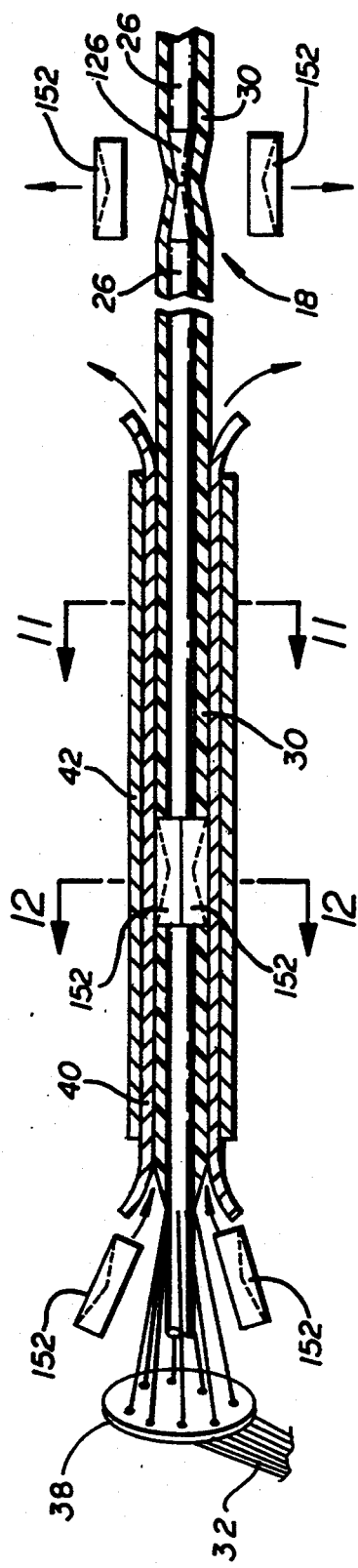
FIG. 10 is a schematic representation of a pultrusion machine corresponding generally with FIG. 5, and illustrating use of the external mold members of FIG. 9.
Figure 12:
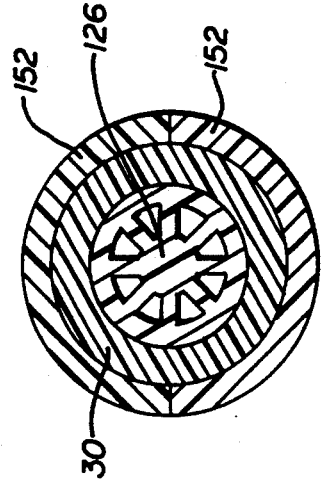
FIG. 12 is a sectional view taken generally along the line 12—12 of FIG. 10.
Figure 11:
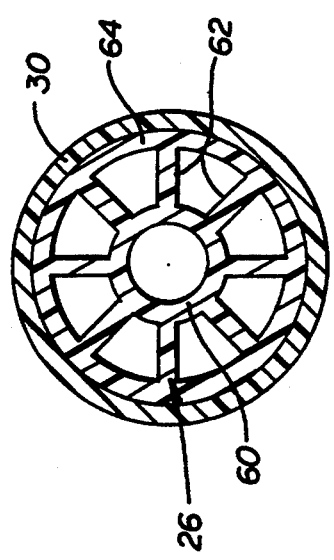
FIG. 11 is a sectional view taken generally along the line 11—11 of FIG. 10.

The irregular core section 126 is associated with the modified external mold members 152 to shape the outer surface of the resultant load-bearing rod 18 into the irregular profile. FIG. 9 shows the mold members 152 in the form of a pair of mold shells of semicircular cross section each having a concave inner face 154 which essentially mirrors the outer profile shape of the filler core 126. As shown in FIG. 10, the pair of mold shells 152 are inserted into the pultrusion die tube in a position about the resin coated filters 32, whereby the mold shells enclose and surround the rod-forming components. The mold shells 152 define a smooth-surfaced exterior to ride smoothly through the die tube 40, for purposes of shaping the fibers 32 in conformance with the outer surface of the filler core 126 and the faces 154 of the mold shells. In accordance with one important aspect of the invention, these shaping surfaces are designed to maintain the cross sectional area of the resultant fiber-resin jacket 30 substantially constant for the entire length of the rod 18. Accordingly, the radial thickness of the jacket 30 is shaped by the core 126 and mold shells 152 to increase as an inverse function of localized jacket diameter, as depicted in FIGS. 11 and 12.

At the exit end of the pultrusion tube 40, the mold shells 152 are quickly and easily removed from the rod 18, as shown in FIG. 10. The rod 18 can then be subjected to further processing, such as molding of the reinforcing tip 20 and the grip 22 thereon.

Exceptional test results have been achieved by employing the method and apparatus of the present invention. The tool handle 10 provides significantly increased tensile and flexural strength without increasing the weight of the handle, and the manufacturing process permits use of low-cost fiber and resin materials, thus minimizing the costs of manufacture. From the foregoing it will be appreciated that cross-fibers are not necessary to increase the interlaminar and hoop strength of the tool handle 10, but rather the advantages of the present invention, and the significant increase in flexural strength of the tool handle 10, can be achieved while utilizing unidirectional fibers during a pultrusion process. By providing the irregular profiles on the outer surfaces of the cores 26 and 28 and/or the fiber-resin jacket 30, which permit key-locking together of the facing layers of the composite tool handle 10, the handle's resistance to shear failure through the resin in a direction perpendicular to the applied load is significantly greater in comparison with prior composite tool handles.

Although several particular embodiments of the invention have been described in detail for purposes of illustration, various modifications may be made without departing from the spirit and scope of the invention. Accordingly, the invention is not to be limited, except as by the appended claims.

What is claimed is:

1. A process for manufacturing a composite tool handle, the steps comprising:
    feeding a core into a pultrusion die tube, wherein the core includes an outer surface defined by an irregular profile shape;
    surrounding the core with resin coated fibers;
    feeding a mold insert belt having a mold face of an irregular profile shape into the pultrusion die tube in a space between the die tube and the resin coated fibers;
    pulling the core through the pultrusion die tube while keeping the core surrounded by the resin coated fibers; and
    curing the resin coated fibers around the core to form a fiber-resin jacket having an inner surface which conforms to the outer surface of the core to key-lock the fiber-resin jacket to the core, and an outer surface which conforms to the mold face.

2. A process as set forth in claim 1, wherein the step of feeding a core into a pultrusion die tube includes the steps of alternately feeding sections of lightweight filler core and relatively strong reinforcing core into the die tube.

3. A process as set forth in claim 1, including the step of forming the outer surface of the core to have a corrugated profile shape.

4. A process as set forth in claim 3, wherein the corrugations in the corrugated profile shape are in a sinusoidal configuration.

5. A process as set forth in claim 4, wherein each corrugation of the sinusoidal configuration is about 0.030 inch deep and about 1.125 inch long.

6. A process as set forth in claim 1, including the step of molding a secondary jacket onto the fiber-resin jacket over the outer surface thereof, wherein an inner surface of the secondary jacket conforms to the outer surface of the fiber-resin jacket to key-lock the secondary jacket to the fiber-resin jacket.

7. A process as set forth in claim 6, wherein the secondary jacket includes a reinforcing tip molded onto the fiber-resin jacket to strengthen the handle at its attachment to a tool head.

8. A process as set forth in claim 7, wherein the secondary jacket includes a grip molded onto the fiber-resin jacket adjacent to the reinforcing tip.

9. A process as set forth in claim 1, wherein the mold insert belt is formed in a continuous loop.

10. A process as set forth in claim 1, further including the step of removing the mold insert belt from the handle at an exit end of the die tube.

11. A process as set forth in claim 1, wherein the mold insert belt cooperates with the core to form the fiber-resin jacket with a substantially uniform cross sectional area along the length of the handle.

12. A process for manufacturing a composite tool handle, the steps comprising:
 feeding a core into a pultrusion die tube;
 surrounding the core with resin coated fibers;
 inserting a mold insert belt having a mold face defining an irregular profile shape into a space between the resin coated fibers and the die tube;
 pulling the core through the pultrusion die tube while keeping the core surrounded by the resin coated fibers, and while keeping the mold insert belt between the die tube and the resin coated fibers;
 curing the resin coated fibers around the core to form a fiber-resin jacket having an outer surface with an irregular profile shape; and
 removing the mold insert belt from the fiber-resin jacket.

13. A process as set forth in claim 12, wherein the mold insert belt is formed in a continuous loop.

14. A process as set forth in claim 12, wherein the mold insert belt cooperates with the core to form the fiber-resin jacket with a substantially uniform cross sectional area along the length of the handle.

15. A process as set forth in claim 12, including the step of molding a secondary jacket onto the fiber-resin jacket over the outer surface thereof, whereby an inner surface of the secondary jacket conforms to the outer surface of the fiber-resin jacket to key-lock the secondary jacket to the fiber-resin jacket.

* * * * *